Jan. 26, 1971 W. C. CARTER ET AL 3,559,168

SELF-CHECKING ERROR CHECKER FOR k-OUT-OF-n CODED DATA

Filed July 25, 1968 6 Sheets-Sheet 1

INVENTORS
WILLIAM C. CARTER
KEITH A. DUKE
PETER R. SCHNEIDER

BY Roy R. Schlemmer, Jr.
ATTORNEY

SELF-CHECKING ERROR CHECKER FOR k-OUT-OF-n CODED DATA

Filed July 25, 1968 6 Sheets-Sheet 6

3,559,168

SELF-CHECKING ERROR CHECKER FOR *k*-OUT-OF-*n* CODED DATA

William C. Carter, Ridgefield, Conn., and Keith A. Duke, Wappingers Falls, and Peter R. Schneider, Peekskill, N.Y., assignors to International Business Machines Corporation, Armonk, N.Y., a corporation of New York Filed July 25, 1968, Ser. No. 747,665
Int. Cl. H03k 13/32; G08c 25/00
U.S. Cl. 340—146.1 5 Claims

ABSTRACT OF THE DISCLOSURE

A series of self-checking error checking circuits are disclosed for checking *k*-out-of-*n* coded data lines. The *n* lines are broken into two, preferably equal, groups. A logic equation is derived for each group of lines whereby, with any *k*-out-of-*n* coded data signal applied to the input, at least two complementary output signals are produced. Any error appearing in the received code will be indicated as such by non-complementary outputs from the checker in the output of the checker. Malfunctions or failures in the checking circuit are checked by certain legitimate code signals which similarly cause an error representation in non-complementary outputs at the output of the checker.

CROSS REFERENCE TO RELATED APPLICATIONS

Reference is hereby made to application Ser. No. 747,522 of W. C. Carter and P.R. Schneider, filed concurrently herewith and entitled "Self-Checking Error Checker for Parity Coded Data" and to application Ser. No. 747,533 of W. C. Carter, K. A. Duke, and P. R. Schneider entitled "Self-Checking Error Checker for Two-Rail Coded Data" also filed concurrently herewith for a description of two similar types of self-checking checkers. The self-checking checkers of all of these applications have certain characteristics in common and the cross reference to these applications may be helpful for a better understanding of the principles and operation of the present application. They have been filed separately as they relate to different data coding systems.

BACKGROUND OF INVENTION

As present day electronic computers become evermore complex and sophisticated, the numbers of circuits have increased to gigantic proportions with a concurrent reduction in time for performing a given computation. With this large increase in the total numbers of circuits in today's modern complex computing systems, it will be apparent that the number of locations in which an error or fault can occur, has been greatly multipled. Moreover, if a given faulty component is producing incorrect data, a great many errors or incorrect computations can be produced within a very short space of time until the fault is detected.

In the past many schemes have been proposed for detecting errors in various sections of a computing system. Probably the most wide spread is the use of parity checking wherein an extra bit or bits accompany the transmitted data bits and are utilized to indicate the proper data content of a particular transmission, i.e., normally the parity bit indicates whether an odd or even number of "1's" appears in the data transmission proper. However, for such parity checking systems, means must be provided for detecting and generating the proper parity bits at various transmission points within the computer and additional means must be provided for checking the parity. In the past most checking systems have not themselves been checkable during normal data processing. In other words, if the checker failed so as to indicate an "error free" condition, subsequent errors would obviously go undetected until some other means picked up the system error.

With the increasingly greater load, which must be borne by the customer engineers who have the responsibility of maintaining and repairing computers, any reliable diagnostic circuits built in a computer system are of invaluble aid, both in terms of indicating that an error is present in the system and wherever possible the precise location of the faulty hardware. In the past the provision of large amounts of error detection circuitry has been considered prohibitive in terms of hardware cost. However, with the vastly more complex present day computers and the extreme difficulty in obtaining and training qualified service personnel, the cost disadvantages of reliable diagnostic equipment and circuitry built into the computer is becoming more attractive.

Further, the advent of integrated circuit technology is rapidly reducing the cost of individual circuit blocks to the point where heretofore financially unfeasible hardware installed for the purpose of error detection and correction is beginning to look more attractive.

It will be apparent from the following description of the present invention that the primary concern hereof is the provision of hardware for the detection of errors occurring within a computing system, both function circuits and checking circuits. The particular use made of the error detection information once obtained forms no part of the present invention and accordingly will not be specifically spelled out. However, it will be obvious to one skilled in the art that such information could readily be used for either automatic repair or for merely giving indications to appropriate service personnel for diagnostic and repair purposes.

SUMMARY OF THE INVENTION AND OBJECTS

It has now been found that self-testing error checkers may be provided for the generalized case of *k*-out-of-*n* coded data which will produce an error indication in the event of either an incorrect data signal or malfunction in the checker itself. As will be understood, a *k*-out-of-*n* code means a fixed number of binary "1's" are present in any valid data group of *n* bits. The instant error checker must check each and every bit in a data set as well as have the inherent ability of checking itself while simultaneously processing the data bits.

The self-testing checking circuits proposed by the present invention have two primary characteristics. The checker output distinguishes the presence of code message inputs and error message inputs, i.e., code message inputs produce one set of checker outputs and error message inputs produce a completely different (disjoint) set of checker outputs. For every given failure in the checking circuit there exists at least one code message input which tests for that given failure, i.e., given the failure, when the proper code message is applied the checker will produce an output different from that produced when code messages are applied to a correctly functioning checking circuit. The first characteristic insures that the checking circuit can be used to detect the presence of error messages. The second characteristic insures that the checking circuit is completely self-testing during the normal processing of code messages. Special mechanisms to test for the correct operation of the checking circuitry are eliminated.

These two characteristics require that the checking circuits have more than one output. If only one output existed, the first characteristic would require that the output take on one value, say 1, for code messages and the opposite value, say 0, for error messages. But then the second characteristic could not be satisfied since the checker output could fail in the stuck-at-1 position and application of code messages would never detect this failure. It should be noted that this failure also disables all future error detection ability, thus more than one output is mandatory.

For simplicity of discussion, each checking circuit to be described in detail here will have just two outputs. These two outputs satisfy the first characteristic by becoming either "01" or "10" for code message inputs and either "00" or "11" for error message inputs. Given a failure in the checking circuit, the second characteristic is satisfied by having at least one code message test for this given failure by producing either a "00" or "11" output if the failure exists. Most of the circuits will be shown in AND-OR or OR-AND configurations but it is always possible to perform commonly known transformations to change them to NAND or NOR logic.

For the generalized $k$-out-of-$n$ coded data format, the data lines are essentially broken up into a number of groups in the checked embodiment to facilitate the design of the checker. A series of logical equations are derived to provide a circuit which will test all data lines as well as its own operation and still meet the above criteria of providing two outputs. The following description of the invention will indicate how the generalized logical equations are used to design a checker circuit for a particular code having a fixed value for $k$ and $n$.

It is accordingly a primary object of the present invention to provide an error checking circuit which is itself testable.

It is a further object to provide such a checking circuit for use to test $k$-out-of-$n$ coded data.

It is yet another object to provide such a checking circuit having at least two different outputs when an error free condition is present.

It is a still further object to provide such a checking circuit which produces a readily discernible output signal whenever an error is detected in the coded data or the checker itself is defective.

It is a further object to provide such a checking circuit constructed of at least two logic trees wherein the final output of each tree is a single binary function.

It is another object to provide such a checking circuit constructed of conventional logic blocks.

It is another object to provide such a checking circuit wherein the two outputs of the checking circuit may be defined by boolean equations for a general $k$-out-of-$n$ code wherein logic circuitry may be readily assembled and connected to the input data lines to test said lines.

The foregoing and other objects, features, and advantages of the invention will be apparent from the following more particular description of preferred embodiments of the invention, as illustrated in the accompanying drawings.

DESCRIPTION OF THE DISCLOSED EMBODIMENTS

The objects of the present invention are accomplished by a self-checking error checking circuit for use with a $k$-out-of-$n$ coded data. The data lines are divided into two groups, A and B. Said checker comprises a logical circuit for obtaining the values of $c_1$ and $c_2$ according to the following relationships:

$$c_1 = \sum_{i=\alpha_1}^{\alpha_2} [(k_a \geq i) \wedge (k_b \geq k - i)]$$

(even values of $i$ only)

$$c_2 = \sum_{i=\alpha_1}^{\alpha_2} [(k_a \geq i) \wedge (k_b \geq k - i)]$$

(odd values of $i$ only)

wherein $k$=specified number of binary ones in the code,
$n$=total number of bits in the code,
$k_a$=total number of ones in Group A,
$k_b$=number of ones occurring in Group B,
$n_a$=number of bits in Group A,
$n_b$=number of bits in Group B,
$\alpha_1$ is the greater of $-1$ and $(k-n_b)$,
$\alpha_2$ is the lesser of $n_a$ and $(k+1)$
$\Sigma$=the OR of the terms "obtained when the function is evaluated between the limits $\alpha_1$ and $\alpha_2$."

It is shown in the subsequent description how the above formula is evaluated to provide circuitry capable of producing $c_1$ and $c_2$ with the specific values of $k$ and $n$ as well as specified groups, A and B, in a number of examples. In each of these described circuits, the final outputs $c_1$ and $c_2$ are complementary if both the data is error free and the checking circuit is operating properly. If not, the outputs will be the same and, as will be described subsequently, this coincident output indicates an error in either the data or the checking circuit.

Figure 1:
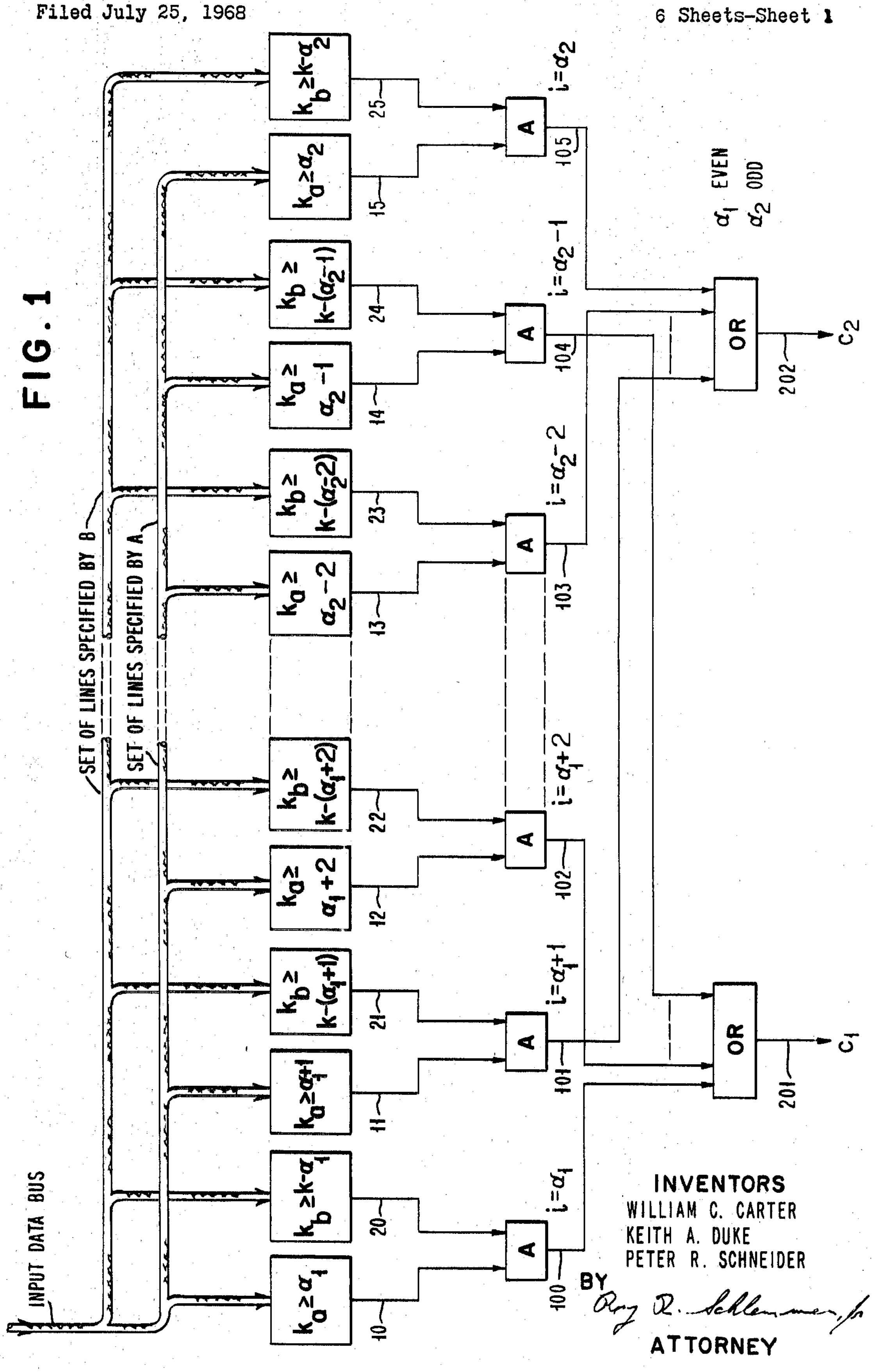
FIG. 1 comprises a combination, logical and functional, block diagram of a self-checking checker for $k$-out-of-$n$ coded data illustrating the generalized form of such a checker construction in accordance with the principles of the present invention.

The bit positions $X_1, \ldots, X_n$ of the data message as shown in FIG. 1 are divided into two groups, A and B. Any division can be used provided each group contains at least one bit. The resulting checking circuit is generally simpler if the groups are approximately the same size. If they are unequal, the larger group is designated A by convention. The number of bit positions in A and B will be designated $n_a$ and $n_b$ respectively.

$$(1) \qquad n_a + n_b = n \qquad n_a \geq n_b \geq 1$$

Each checker is designed so that for code messages it gives one value of its output (e.g. "10") when there is an even number of "1's" in Group A and the other value ("01") when there is an odd number of "1's" in Group A. If the number of "1's" in the entire message exceeds $k$, the output value assumes one of its error values (e.g. "11"). If the number of "1's" is less than $k$, it assumes the other error value ("00"). The number of "1's" actually in the A and B portions of a given message will be designated $k_a$ and $k_b$ respectively. Thus code messages always have $k_a+k_b=k$.

It is simpler to detect that the number of "1's" in a given group of bits is greater-than-or-equal-to a given value than it is to detect that the number is exactly equal to a given value. The checkers described here use "greater than" detection networks, which are described below.

Each checker consists of two independent logic networks, each network having a single output whose values will be referred to as $c_1$ and $c_2$. The networks perform the following functions.

(2) $$c_1=\sum_{i=\alpha_1}^{\alpha_2}[(k_a\geq i)\wedge(k_b\geq k-i)]$$
(even values of $i$ only)

(3) $$c_2=\sum_{i=\alpha_1}^{\alpha_2}[(k_a\geq i)\wedge(k_b\geq k-i)]$$
(odd values of $i$ only)

Here $i$ is an index which takes on all integer values starting at $\alpha_1$, running up to and including $\alpha_2$, i.e., $i=\alpha_1, \alpha_1+1, \alpha_1+2, \ldots, \alpha_2-2, \alpha_2-1, \alpha_2$. Only the even values of $i$ are used in selecting the terms for the sum implementing $c_1$ and only odd values of $i$ are used for the sum implementing $c_2$.

The $\Sigma$ represents the OR of the set of general terms of the form shown for the set of values of $i$ indicated and the limits are defined as:

$\alpha_1$ is the greater of $-1$, $(k-n_b)$
$\alpha_2$ is the lesser of $n_a$, $(k+1)$ A general implementation of these equations is shown in FIG. 1 for the case where $\alpha_1$ is even and $\alpha_2$ is odd. The data buss to be checked has its lines split into two subbusses: one with the lines specified by A and another with the lines specified by B. Each tree circuit (e.g. 10, 20 and 100; or 11, 21 and 101; etc.) comprises the implementation of one term of the form $$(k_a\geq i)\wedge(k_b\geq k-i)$$

as specified in Equations 2 and 3. The two OR gates 201 and 202 perform the indicated summation to generate $c_1$ and $c_2$. Since $c_1$ is formed by summing the terms for $i$ even and $c_2$ by summing the terms for $i$ odd, alternate tree circuits feed gate 201 and the remaining trees feed gate 202. If $\alpha_1$ is odd, the first tree in the sequence (and alternate ones thereafter) feeds gate 202 instead of 201. Similarly, when $\alpha_2$ is even the last tree circuit ends up feeding gate 201 instead of 202.

When $i\leq 0$, the logical value of the term $(k_a\geq i)$ is always "1" and the corresponding function block in FIG. 1 need not be implemented. Also when $(k-i>n_b)$, the term $(k_b\geq(k-i))$ always assumes the logical value "0" and thus the entire term in $i$ and corresponding tree circuit in FIG. 1 need not be implemented.

The "greater-than-or-equal-to" networks may be implemented either as AND-OR configurations or as OR-AND configurations, which ever is most convenient. To implement $(k_a\geq i)$ in an AND-OR circuit, take $$\binom{n_a}{i}=\frac{n_a!}{i!(n_a-i)!}$$

different selections of $i$ bits from the $n_a$ available bit positions in A and use them as inputs to $$\binom{n_a}{i}\text{ AND gates}$$

each gate having $i$ inputs to receive a particular selection. These $$\binom{n_a}{i}\text{ AND gates}$$

are then ORed together to form $(k_a\geq i)$. To implement $(k_a\geq i)$ in an OR-AND configuration take each different selection of $(n_a+1-i)$ bits from the $n_a$ available bit positions in A and use them as inputs to $$\binom{n_a}{n_a+1-i}$$

Figure 2A:
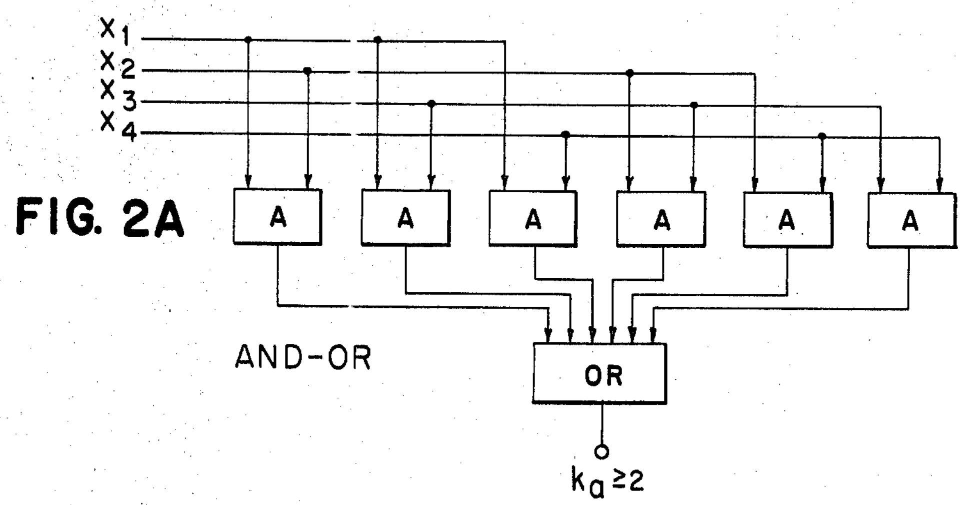
FIG. 2A comprises a logical schematic diagram of a functional block performing the function of determining if $k_a \geq 2$ for a 4 input bit data set.
Figure 2B:
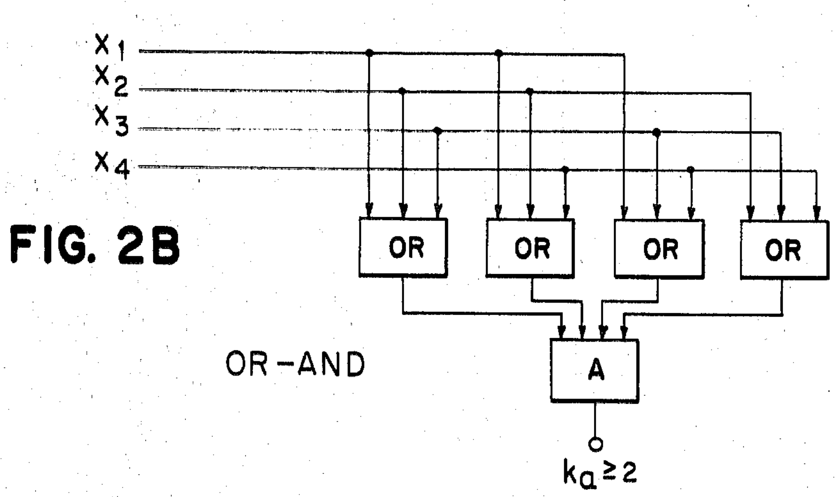
FIG. 2B comprises a logical schematic diagram of a functional block similar to FIG. 2A for solving the statement $k_a \geq 2$ constructed in OR-AND logic.

OR gates, each gate having $n_a+1-i$ inputs to receive a particular selection. The outputs of the OR gates are then ANDed together. As an example, let $A=\{X_1,X_2,X_3,X_4\}$; $n_a=4$ and $i=2$. FIG. 2A shows the AND-OR implementation of $(k_a\geq 2)$. The $$\binom{n_a}{i}=\binom{4}{2}=6$$

possible different selections of two bit positions from A are shown as inputs to the 6 AND gates. These are then ORed together in the output gate. FIG. 2B shows the OR-AND circuit which uses $$\binom{n_a}{n_a+1-i}=\binom{4}{3}=4$$

OR gates each having as input one of the 4 possible selections of 3 variables from A. Note that when $i=n_a$ the circuit becomes a single AND gate and when $i=1$ it becomes a single OR gate.

In certain situations, implementing $c_1$ and $c_2$ in the tree circuits as defined by Equations 2 and 3 will not result in a self-testing circuit. This situation will occur whenever $n_a>k$ (or $n_b>k$) and it is necessary to implement $$(k_a\geq k+1)$$

The tree circuit implementing this term is untested by code messages. However, whenever this situation occurs the term $(k_a\geq k+1)$ will always occur in conjunction with the term $(k_a\geq k-1)(k_b\geq 1)$. The property of having the checking circuit tested by code messages is achieved by merging the tree circuits arising from these two terms by changing the given expression:

(4) $$[k_a\geq k+1]\vee[(k_a\geq k-1)\wedge(k_b\geq 1)]$$

to the new, equivalent expression (5) $$[k_a\geq k-1]\wedge[k_a\geq k+1)\vee(k_b\geq 1)]$$

The right portion of this latter expression can be implemented in a form tested by code messages by generating the OR-AND version of $(k_a\geq k+1)$ and entering all the bits of group B into every OR gate of that implementation. Then $(k_a\geq k-1)$ is also implement in OR-AND form. Finally the two circuits are ANDed as specified in Equation 5 (cf. the example below).

Difficulties of testability may also arise when $k>n/2$. In these cases it is possible to derive a testable checker by following the above procedure for a designing checker except $k$ is replaced by $(n-k)$. After the design is complete the logical complement of the resulting circuit is then taken.

A specific example will be given to show how the previous general results can be applied to generate self-testing checking circuits for a specific $k$-out-of-$n$ code. This example is illustrative of the reductions obtainable for any $k$-out-of-$n$ code.

Example: Consider a 2-out-of-5 code with $$A=\{X_1, X_2, X_3\}$$

and $B=\{X_4, X_5\}$. The following parameters are thereby defined:

$n=5$ $n_a=3$ $\alpha_1=0$
$k=2$ $n_b=2$ $\alpha_2=3$

Listed below are the five terms present in equations 2 and 3.

$i=\alpha_1=0$ $(k_a\geq 0)\wedge(k_b\geq 2)=(k_b\geq 2)$
$i=1$ $(k_a\geq 1)\wedge(k_b\geq 1)=(k_a\geq 1)\wedge(k_b\geq 1)$
$i=2$ $(k_a\geq 2)\wedge(k_b\geq 0)=(k_a\geq 2)$
$i=\alpha_2=3$ $(k_a\geq 3)\wedge(k_b\geq -1)=(k_a\geq 3)$ The first term and the last two terms reduce because the expressions with numbers less than or equal to 0 are always true, hence are logically 1. Equation 2 specifies $c_1$ to be the OR of the terms for $i$ even:

$$c_1=[k_b\geq 2]\vee[k_a\geq 2]$$

Similarly Equation 3 specifies that $c_2$ is the OR of the terms for $i$ odd:

$$c_2=[(k_a\geq 1)\wedge(k_b\geq 1)]\vee[k_a\geq c]$$

Figure 3:
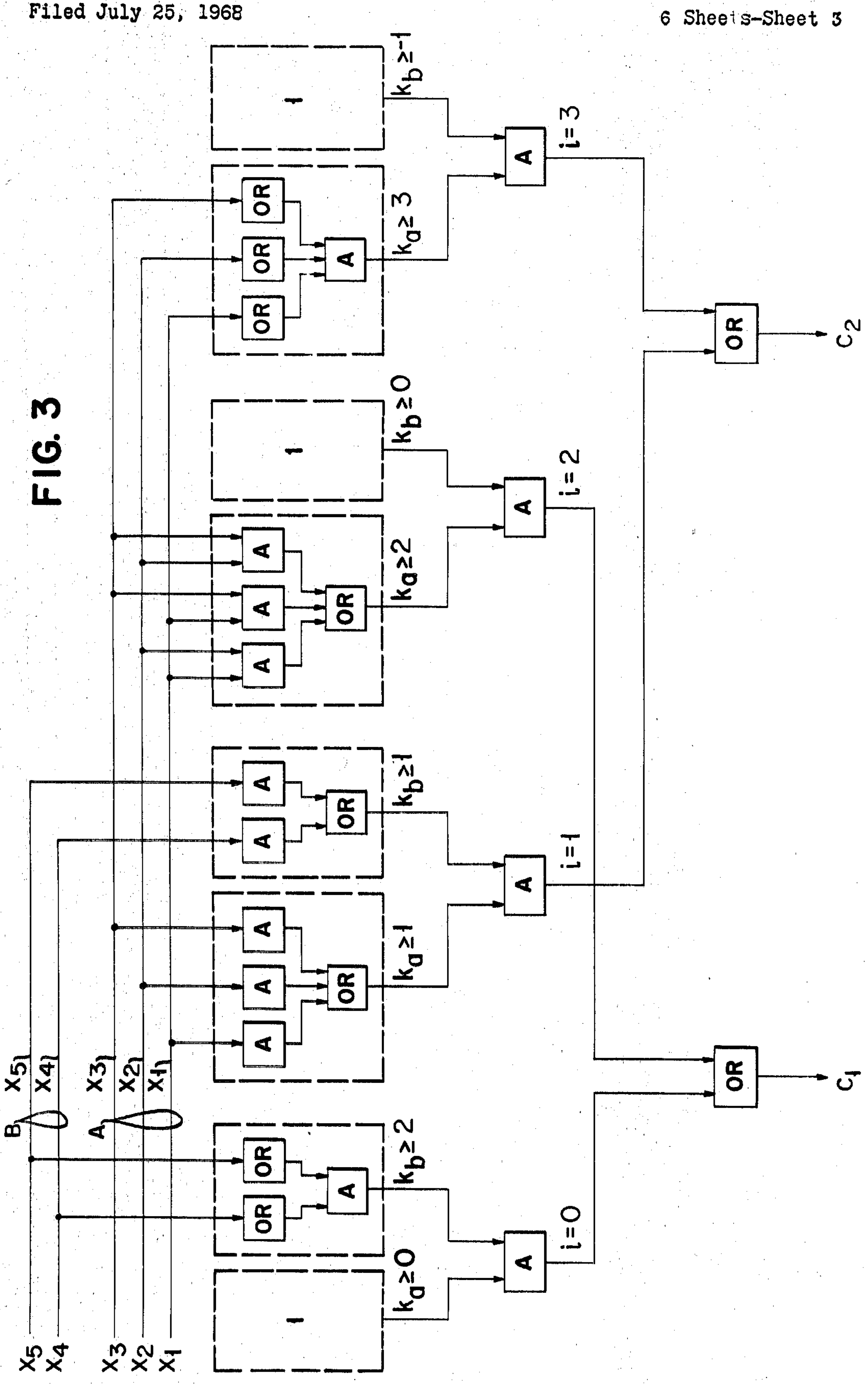
FIG. 3 comprises the initial form of a self checking checker for 2-out-of-5 data sets constructed in accordance with the general format illustrated in FIG. 1.

Following FIG. 1, these two equations are implemented as shown in FIG. 3. For $i=0$, 3 the "greater-than-or-equal-to" functions are implemented as OR-AND and for $i=1$, 2 as AND-OR. Note again that $k_a\geq 0$, $k_b\geq 0$ and $k_b\geq -1$ are not implemented since they always have value 1.

Examining the implementation of $c_2$ shows that for $i=3$ the previously mentioned special case of $k_a\geq k+1$, or $k_a\geq 3$ in this example, occurs. The AND gate generating $k_a\geq 3$ can never be tested for being stuck-at-0 since no code message has three 1's in it, a necessary condition to test this failure. As indicated before, the form $(k_a\geq k-i)\wedge(k_b\geq i)$, here $(k_a\geq 1)\wedge(k_b\geq 1)$, also occurs in the circuitry implementing $c_2$. The solution to this problem calls for implementing Equation 5

$$[k_a\geq 1]\wedge[(k_a\geq 3)\vee(k_b\geq 1)]$$

using the OR-AND form of $k_a\geq 3$ with $B=\{X_4, X_5\}$ fed into each of the three OR gates and then ANDing this tree circuit with $k_a\geq 1$. The result is shown in FIG. 4.

Figure 4:
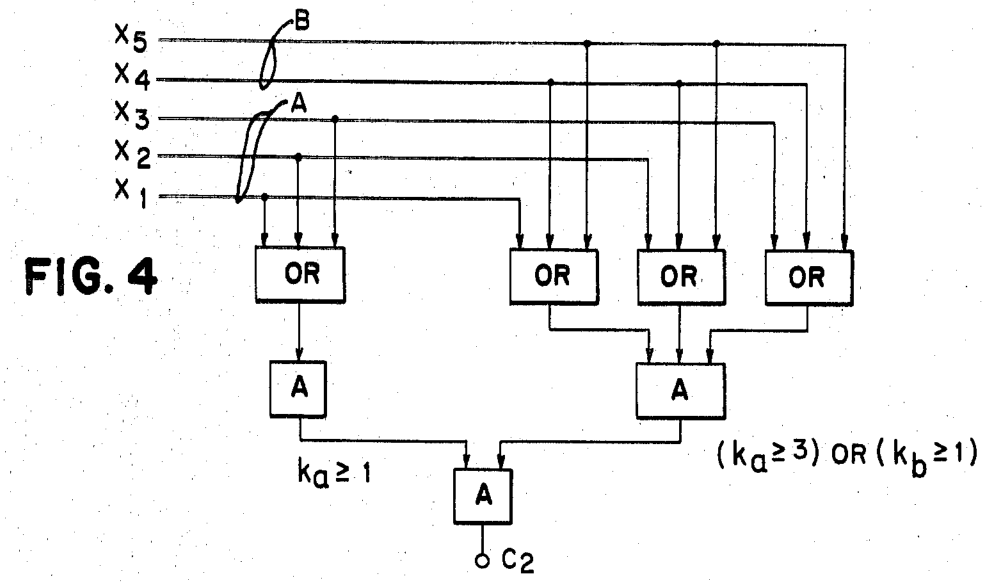
FIG. 4 comprises a logical schematic diagram of the $c_2$ output from FIG. 3 which has been modified according to procedures specified in the present invention to make it self-checking.
Figure 5:
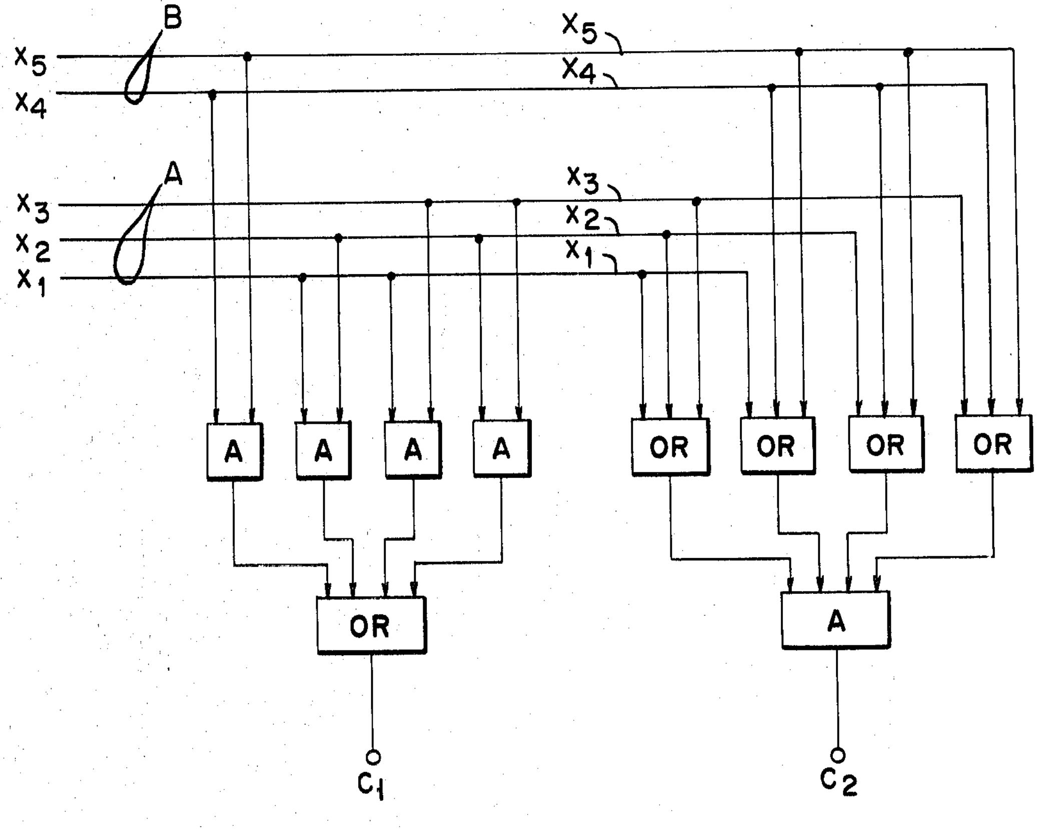
FIG. 5 comprises a final logical schematic diagram of a self-checking checker for a 2-out-of-5 coded data sets which uses the $c_1$ circuit implementation of FIG. 3 and the $c_2$ circuit implementation of FIG. 4 with certain redundant, unnecessary logic blocks eliminated.

When the implementation of $c_1$ in FIG. 3 and the implementation of $c_2$ in FIG. 4 are refined, by removing redundant gates such as AND's feeding AND's, single input gates, etc., the final checking circuit in FIG. 5 is obtained. It is easy to show that the 10 code messages for a 2-out-of-5 code completely tests this checking circuit for the failures where any line is stuck-at-0 or stuck-at-1. In addition, many other commonly occurring failures are tested.

Example: Those codes where $k=1$ are worthy of special notice because of the rather unique circuits which result for a 1-out-of-$n$ code. A 1-out-of-$n$ code is used as the output of any address or instruction decoder and a large number of other locations in any computer system. The 1-out-of-$n$ checker described below has particular utility in these portions of the computer system. For the following description of the present example let the following values apply.

Let $A=\{X_1, \ldots, X_m\}$ and $B=\{X_{m+1}, \ldots, X_n\}$

It is customary (though not mandatory) to make $m$ nearly equal to $n/2$ so that the gates in the implementation of $c_1$ and $c_2$ have nearly equal numbers of inputs.

Figure 6:
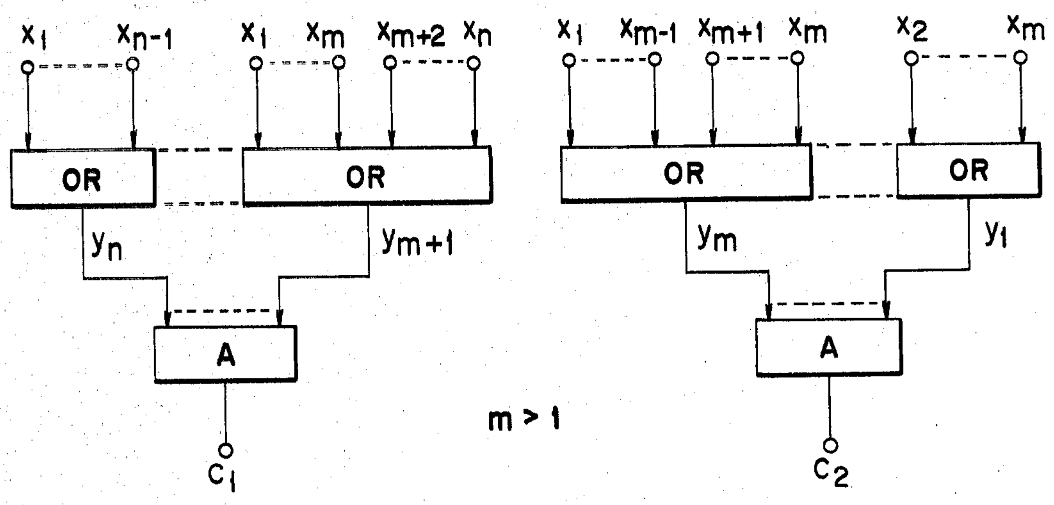
FIG. 6 comprises a generalized logical schematic diagram of a self-checking checker for the case of 1-out-of-$n$ coded data sets wherein the required logical components are illustrated in a generalized fashion.

The resulting self-testing checking circuit is as shown in FIG. 6. In general each $y_i$ is defined as (6) $$y_i=\bigvee_{i\neq j} X_j=X_1\vee\ldots\vee X_{i-1}\vee X_{i+1}\vee\ldots X_n$$

$$i=1, \ldots, n$$

while $c_1$ and $c_2$ are specified to be (7) $$c_1=\bigwedge_{i=m+1}^{n} Y_i=Y_{m+1}\wedge Y_{m+2}\wedge\ldots\wedge Y_n$$

(8) $$c_2=\bigwedge_{i=1}^{m} Y_i=Y_1\wedge Y_2\wedge\ldots Y_m$$

$$m>1$$

The correctly functioning circuit in FIG. 6 has outputs as follows:

Output:

"00" ---- Error condition where all $X_i$ are "0."
"10" ---- Code message with the "1" occurring in A.
"01" ---- Code message with the "1" occurring in B.
"11" ---- Error condition where more than $X_i$ is "1."

Cause

The circuit in FIG. 6 is self-tested as follows:

(1) $Y_i$ stuck-at-1 is tested by the code message with $X_i=1$.
(2) $Y_i$, $1\leq i\leq m$, stuck-at-0 is tested by those $(n-m)$ code messages which have a "1" in B.
(3) $Y_i$, $m+1\leq i\leq n$, stuck-at-0 is tested by those $m$ code messages which have a "1" in A.
(4) $c_1$ stuck-at-1 (or $c_2$ stuck-at-0) is tested by those $(n-m)$ code messages which have a "1" in B.
(5) $c_1$ stuck-at-0 (or $c_2$ stuck-at-1) is tested by those $m$ code messages which have a "1" in A.

When a $Y_i$ OR gate is not being tested its output has no effect on the checker outputs. The OR-AND implementation is only one of the many which exist for the functions $(c_1, c_2)$. The OR's and AND's may both be replaced by NOR's (which has some technology advantages), the inputs and connections remaining unchanged. The resulting circuit has all the properties attributed to the previous implementation.

Example: In this example a 4-out-of-8 code checker is disclosed. The following parameters are used in this example.

Data Bits—$X_1, X_2, X_3, X_4, X_5, X_6, X_7, X_8$

Figure 7:
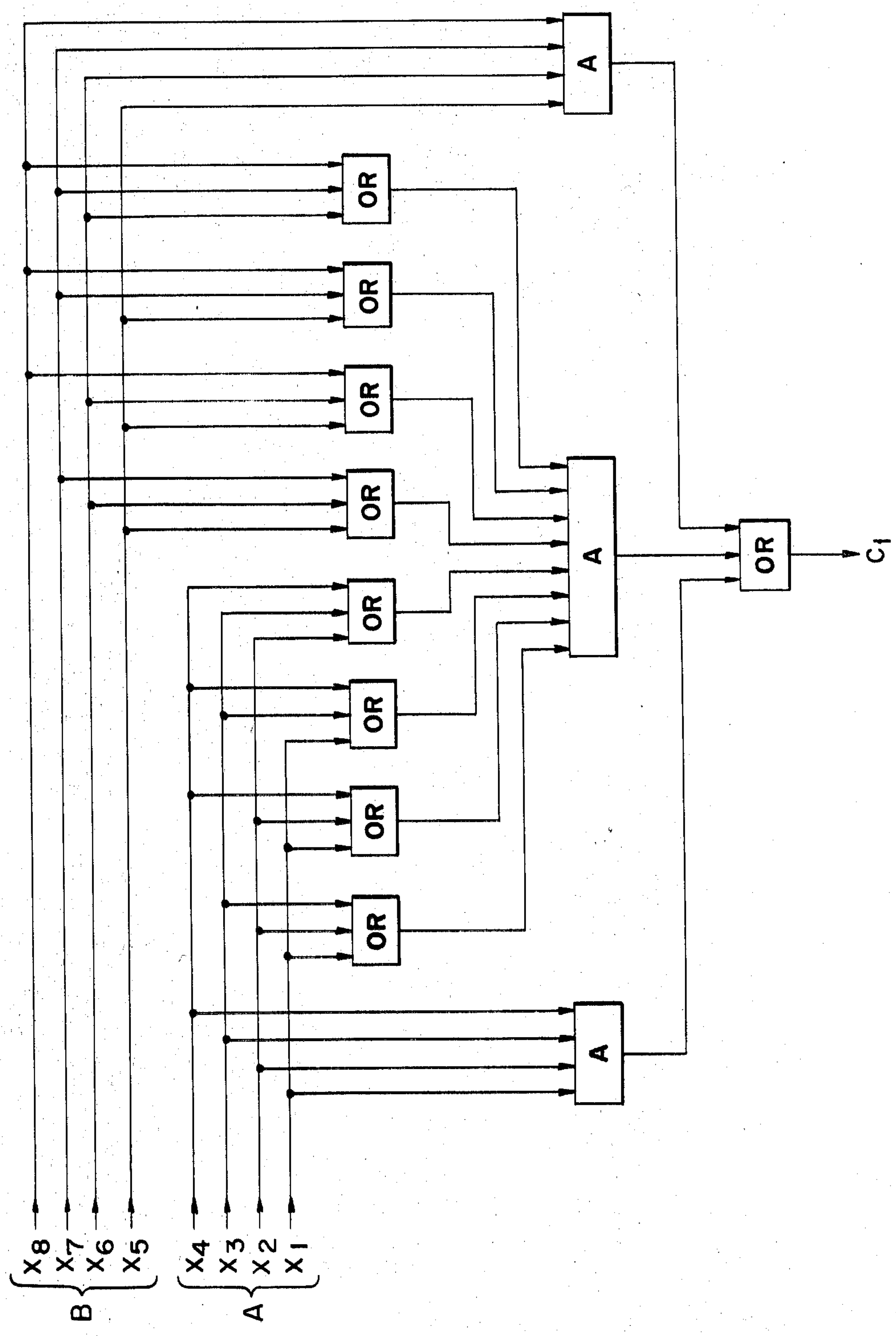
FIG. 7 comprises a logical schematic diagram of a self-checking checker for deriving one of the outputs $C_1$ for the case of a 4-out-of-8 encoded data set.
Figure 8:
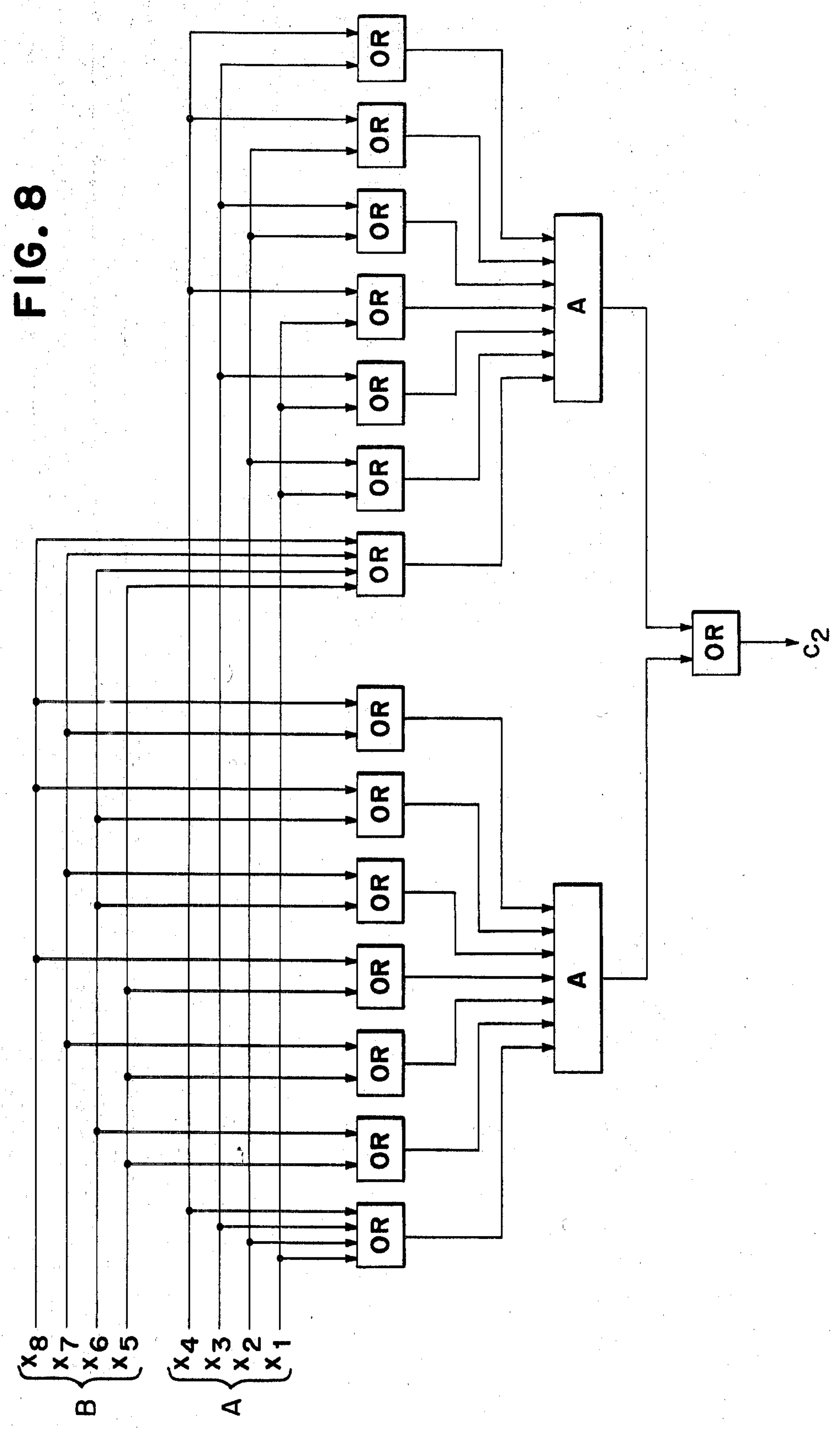
FIG. 8 is similar to FIG. 7 in that it comprises a logical schematic diagram of a self-checking checker for generating the output $c_2$ for the case of a 4-out-of-8 coded data set.

Group A$=X_1, X_2, X_3, X_4$
Group B$=X_5, X_6, X_7, X_8$ $k=4$
$n_a=4$
$n_b=4$
$\alpha_1=0$
$\alpha_2=4$ The following logical equations are derived for the values of $c_1$ and $c_2$ using the above parameters and Equations 2 and 3 defined previously. The logic circuits resulting from these equations for $c_1$ and $c_2$ are shown in FIGS. 7 and 8.

(9) $$c_1=[(k_a\geq 0)\wedge(k_b\geq 4)]\vee[(k_a\geq 2)\wedge(k_b\geq 2)]\vee[(k_a\geq 4)\wedge(k_b\geq 0)]$$
$$=(k_b\geq 4)\vee[(k_a\geq 2)]\wedge(k_b\geq 2)]\vee(k_a\geq 4)$$

(10)
$$c_2=[(k_a\geq 1)\wedge(k_b\geq 3)]\vee[(k_a\geq 3)\vee(k_b\geq 1)]$$

One real advantage in all these implementations is that they do *not* require the use of inverters to complement the $X_i$. This saves in circuit cost, delay, etc. Further it avoids the problem of having untestable inverters.

While the invention has been particularly shown and described with reference to preferred embodiments thereof, it will be understood by those skilled in the art that various changes in form and details may be made therein without departing from the spirit and scope of the invention.

What is claimed is:

1. A self-testing error checking circuit for use with $k$-out-of-$n$ coded data, said checking circuit having $n$ input data lines, said data input lines being divided into two groups, A and B, said checking circuit comprising a logical circuit for producing two outputs $c_1$ and $c_2$, said logic circuit being specified to obtain said values $c_1$ and $c_2$ according to the following relationships:

$$c_1=\sum_{i=\alpha_1}^{\alpha_2}[(k_a\geq i)\wedge(k_b\geq k-1)]$$

(even values of $i$ only)

$$c_2=\sum_{i=\alpha_1}^{\alpha_2}[(k_a\geq i)\wedge(k_b\geq k-1)]$$

(odd values of $i$ only)

wherein $n$=total number of bits in the data
$k$=specified number of ones in any correct code group
$k_a$=total number of ones in Group A
$k_b$=number of ones occurring in Group B
$n_a$=total number of bits in Group A
$n_b$=total number of bits in Group B
$\alpha_1$ is the greater of $-1$, $(k-n_b)$
$\alpha_2$ is the lesser of $n_a$, $(k+1)$
$\Sigma$=the OR of the terms obtained when the function is evaluated between the limits $\alpha_1$ and $\alpha_2$
$i$=an index which takes on all integer values starting $\alpha_1$ up to and including $\alpha_2$ wherein the data input lines are directly connected to that portion of the logic circuitry satisfying the "greater-than-or-equal-to" logic function.

2. A self-testing error checking circuit as set forth in claim 1 wherein the individual logical "greater-than-or-equal-to" network defined as $(k\geq i)$ is implemented by selectively connecting the individual data input bit lines of the data bus to a first level of AND or OR gates, the number of possible input groups being defined by the formulas:

$$(n_a/i)=\frac{n_a}{i!(n_a-i)!}$$

for a first level AND configuration or $$\binom{n_a}{n_a+1-i}$$

for a first level OR configuration where the AND gates would have $i$ inputs and the OR gates $(n_a+1-i)$ inputs and wherein the outputs of said AND gates are ORed together and the outputs of said OR gates are ANDed together respectively.

3. A self-testing error checking circuit as set forth in claim 2 for testing a two-out-of-five code wherein:

Group A=$X_1, X_2, X_3$
Group B=$X_4, X_5$
$n$=5
$k$=2
$n_a$=3
$n_b$=2
$\alpha_1$=0
$\alpha_2$=3 wherein the logical circuits for deriving $c_1$ and $c_2$ are specified by the following relationship:

$$c_1=[k_b\geq 2]\vee[k_a\geq 2]$$
$$c_2=[(k_a\geq 1)\wedge(k_b\geq 1)]\vee[k_a\geq 3]$$

4. A self-testing error checking circuit as set forth in claim 2 for testing a four-out-of-eight code wherein the following parameters are defined:

Group A=$X_1, X_2, X_3, X_4$
Group B=$X_5, X_6, X_7, X_8$
$k$=4
$n_a$=4
$n_b$=4
$\alpha_1$=0
$\alpha_2$=4 wherein the logical circuits for producing the outputs $c_1$ and $c_2$ are specified by the following relasionships:

$$c_1=(k_b\geq 4)\vee[(k_a\geq 2)\wedge(k_b\geq 2)]\vee(k_a\geq 4)$$
$$c_2=[(k_a\geq 1)\wedge(k_b\geq 3)]\vee[(k_a\geq 3)\vee(k_b\geq 1)]$$

5. A self-testing error checking circuit as set forth in claim 2 for testing a 1-out-of-$n$ code wherein:

Group A=$X_1, X_2, \ldots, X_m$
Group B=$X_{m+1}, X_{m+2}, \ldots, X_n$,
$k$=1
$n_a$=$m$
$n_b$=$n-m$ $$Y_i=\bigvee_{i\neq j}X_j=X_1\vee\ldots\vee X_{i-1}\vee X_{i+1}\ldots\vee X_n$$

wherein $i$=1, 2 . . . , $n$ and wherein the logical circuits for producing the terms $c_1$ and $c_2$ are specified by the relationship:

$$c_1=\bigwedge_{i=m+1}^{n}Y_i=Y_{m+1}\wedge Y_{m+2}\wedge\ldots\wedge Y_n$$

$$c_2=\bigwedge_{i=1}^{m}Y_i=Y_1\wedge Y_2\wedge\ldots\wedge Y_m \qquad m>1$$

References Cited

UNITED STATES PATENTS

| | | | |
|---|---|---|---|
| 2,958,072 | 10/1960 | Batley | 340—146.1X |
| 3,387,263 | 6/1968 | Dosse | 340—146.1X |

OTHER REFERENCES

G J. Saxenmeyer: Two Out of Five Check Circuit, IBM Technical Disclosure, vol. 5, No. 9, February 1963.

MALCOLM A. MORRISON, Primary Examiner

C. E. ATKINSON, Assistant Examiner

U.S. Cl. X.R.

235—153